United States Patent [19]

Morra

[11] Patent Number: 4,759,771
[45] Date of Patent: Jul. 26, 1988

[54] PACKAGING TECHNIQUE FOR BATTERIES
[75] Inventor: Steven L. Morra, Plano, Tex.
[73] Assignee: SGS-Thomson Microelectronics, Inc., Carrollton, Tex.
[21] Appl. No.: 53,141
[22] Filed: May 21, 1987
[51] Int. Cl.$^4$ ............................................. H01M 2/06
[52] U.S. Cl. .................................. 29/623.1; 429/162; 264/272.4
[58] Field of Search .................. 29/623.1, 623.2, 623.5; 429/191, 124, 162, 153, 163, 123, 1; 264/272.21; 437/211

[56] References Cited

U.S. PATENT DOCUMENTS

| | | | |
|---|---|---|---|
| 2,968,686 | 1/1961 | Duddy | 429/153 |
| 3,003,012 | 10/1961 | Duddy | 429/153 |
| 3,449,171 | 6/1969 | Knight | 264/272.21 |
| 4,105,807 | 8/1978 | Arora | 429/191 |
| 4,198,883 | 11/1981 | Komatsu et al. | 437/211 |
| 4,247,603 | 1/1981 | Leffingwell et al. | 429/1 |
| 4,645,943 | 2/1987 | Smith et al. | 429/124 |

FOREIGN PATENT DOCUMENTS 0030149 3/1980 Japan ................................... 429/191

Primary Examiner—Donald L. Walton
Attorney, Agent, or Firm—Roland Plottel

[57] ABSTRACT

The invention covers a method of producing packaged batteries having high internal resistance utilizing semiconductor manufacturing techniques. These include forming an assembly for each battery to be formed of an anode plate and a cathode plate in spaced parallel relationship with a low concentration electrolyte in between the plates. The assembly is then arranged within a recess formed between upper and lower electrically conductive mold elements of a transfer mold. A temporary short circuit is thus created between the plates. The recess defines a battery package configuration. A plastic molding compound is then injected into the recess through a distribution aperture communication with the recess.

13 Claims, 5 Drawing Sheets 4,759,771

PACKAGING TECHNIQUE FOR BATTERIES

TECHNICAL FIELD

The technical field toward which the invention herein is directed is that of packaging batteries according to semiconductor-chip packaging techniques, including for example plastic manufacturing techniques such as injection and transfer molding processes.

BACKGROUND OF THE INVENTION

Batteries in current use industrially, commercially and at the consumer level are produced according to well-known conventional methods, which are different from techniques currently used for packaging semiconductor chips. Accordingly, it is an object of the instant invention to apply the techniques developed in the semiconductor chip packaging arts to the technology of packaging battery devices. Such batteries can be used effectively in conjunction with semiconductor devices, as for example in volatile memory chips in which the contents of the semiconductor memory is evanescent and disappears with a loss of power.

SUMMARY OF THE INVENTION

According to the invention herein, semiconductor chip packaging techniques are used in the construction of parallel plate plastic packaged batteries which have a high level of internal resistance.

In particular, the battery structure developed in accordance with these techniques comprises anode and cathode plates which are integrally a part of the plates from which they extend and which straddle an inner separating member holding an electrolyte material. The anode element is plated or fabricated with a suitable anode material effective for attracting ions from the electrolyte material selected for use in the battery. The cathode plate of the battery is suitable perforated with holes enabling it to hold a suitable cathode material which is generally an anode powder material including a binder.

According to one version of the invention, the batteries are made in a metallic, electrically-conductive mold having upper and lower parts defining recesses indicating the shapes of the batteries to be molded, each of the recesses communicating with an aperture for insertion of the molding compound. The anode and cathode plates are packaged in plastic by injection or transfer molding, leaving only the contact lead portions thereof exposed for electric power supply. This technique shorts out the anode and cathode contact leads for a limited period of time, but does not destroy the battery, because it can be made with a high level of internal resistance in view of the low power requirements demanded in supplying many semiconductor devices.

DETAILED DESCRIPTION OF A PREFERRED EMBODIMENT OF THE INVENTION

Figure 1A:
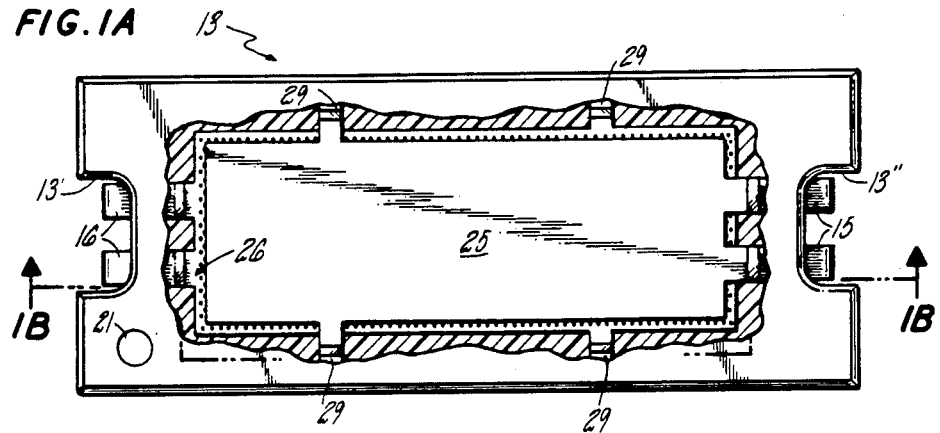
FIGS. 1A through 1E respectfully show top, side cross section, bottom, end and detail views of a battery packaged according to the semiconductor packaging techniques of the invention addressed herein. The top view in FIG. 1A additionally shows certain internal features of the battery in phantom.

FIGS. 1A through 1D show basic structured elements of a battery 13 made according to the invention herein. In particular, FIG. 1A shows a plastic packaged battery 13 which has two recesses 13' and 13" which expose respectively anode and cathode contact leads 15 and 16. Leads 15 and 16 are each downwardly bent at the ends thereof, as conventionally results from semiconductor packaging trim and form techniques and as explicitly suggested in FIG. 1B. The contact leads 15 and 16 are coextensive and materially integral with the respective anode and cathode plates of which they are a part. According to one version of the invention, the anode contact leads 15 extend from the battery package at one end thereof, and the cathode contact leads 16 extend out of the other end thereof.

Figure 1B:
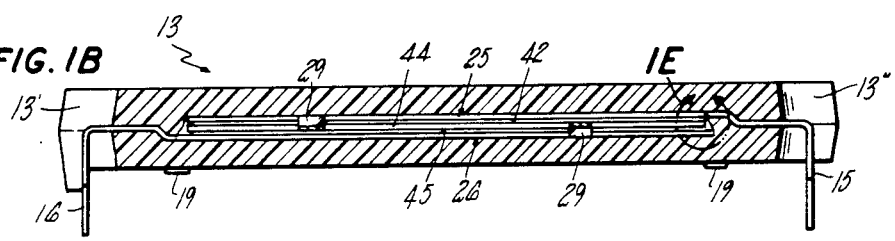
Figure 1C:
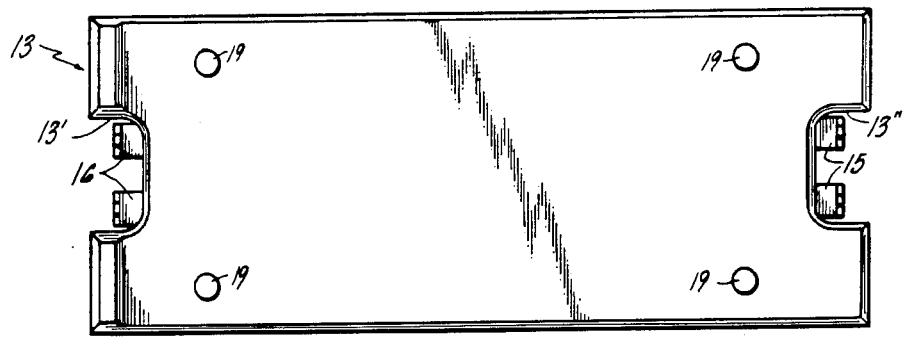
Figure 1D:
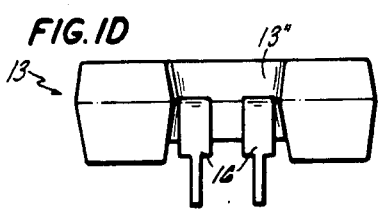

Each of the battery contact leads 16 and 16 has a narrowed tip which can serve as a pin contact for insertion into a standard pin connecting device or coupler, as is well known and as clearly suggested in FIG. 1D.

FIGS. 1A through 1D show further features which are of no direct interest insofar as the invention is concerned, but which nonetheless are part of the preferred embodiment thereof. In particular, FIG. 1C shows standoff feet 19, effective for permitting solvents to get in and out while cleaning stacks of batteries 13 during manufacture. These feet 19 further allow relief for thermal expansion which may cause bending or expansion of the body of battery 13 during use. Instead of the stresses from bending or expansion accordingly being applied at arbitrary locations adjacent to the structure of the battery 13, feet 19 establish a standoff distance which separates the battery 13 from such adjacent bodies which would otherwise interfere with stress relief or bending of the battery 13.

Another feature which may be incorporated in the battery formed according to the invention is pin indicator 21, which is a reference marking on the surface of the battery 13. Because the battery is generally symmetrical, it is frequently useful to note an orientation direction common to all batteries manufactured at a single location.

The top view of battery 13 shown broken away in FIG. 1A discloses the anode and cathode plates 25 and 26 which respectively lie parallel to one another inside battery 13. Contact leads 15 and 16 are integrally a part of these plates 25 and 26 respectively, as already discussed above. For purposes of illustration, the anode plate 25 is shown slightly smaller than the cathode plate 26 in FIG. 1A. The Figure shows tie bars 29 as well, which are useful in positioning and holding the leadframe plates which are finally trimmed and formed into the ultimate battery produced during manufacturing operation. The tie bars 29 are thus useful during molding or injection operation, but serve no useful function in the final battery product.

FIG. 1B further shows, in side cross-section, the overlap of the anode and cathode plates 25 and 26, and graphically illustrates the downward bending of the anode and cathode plates 25 and 26, and graphically illustrates the downward bending of the anode and cathode leads respectively 15 and 16.

Figure 1E:
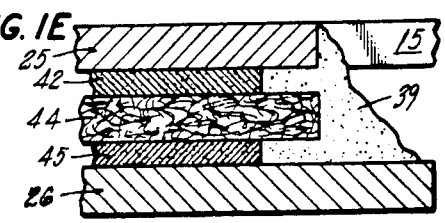

FIG. 1E blows up in detail a portion of the side cross-section of FIG. 1B. The Figure shows clearly the central material 44 for holding an electrolyte solution between plates 25 and 26, straddled by the anode and cathode plates of material 25 and 26. By straddled, it simply meant that the anode plate 25 is on one side of central material 44 and the cathode plate 26 is on the other side thereof. All three pieces including plates 25 and 26, and central material 44 may be adhesively sealed together at their respective edges by a sealing material 39 such as, for example, cyano acrylate. This promotes ease of handling during manufacture and lessens the possibility of electrolyte leakage from the completed battery 13.

Figure 2A:
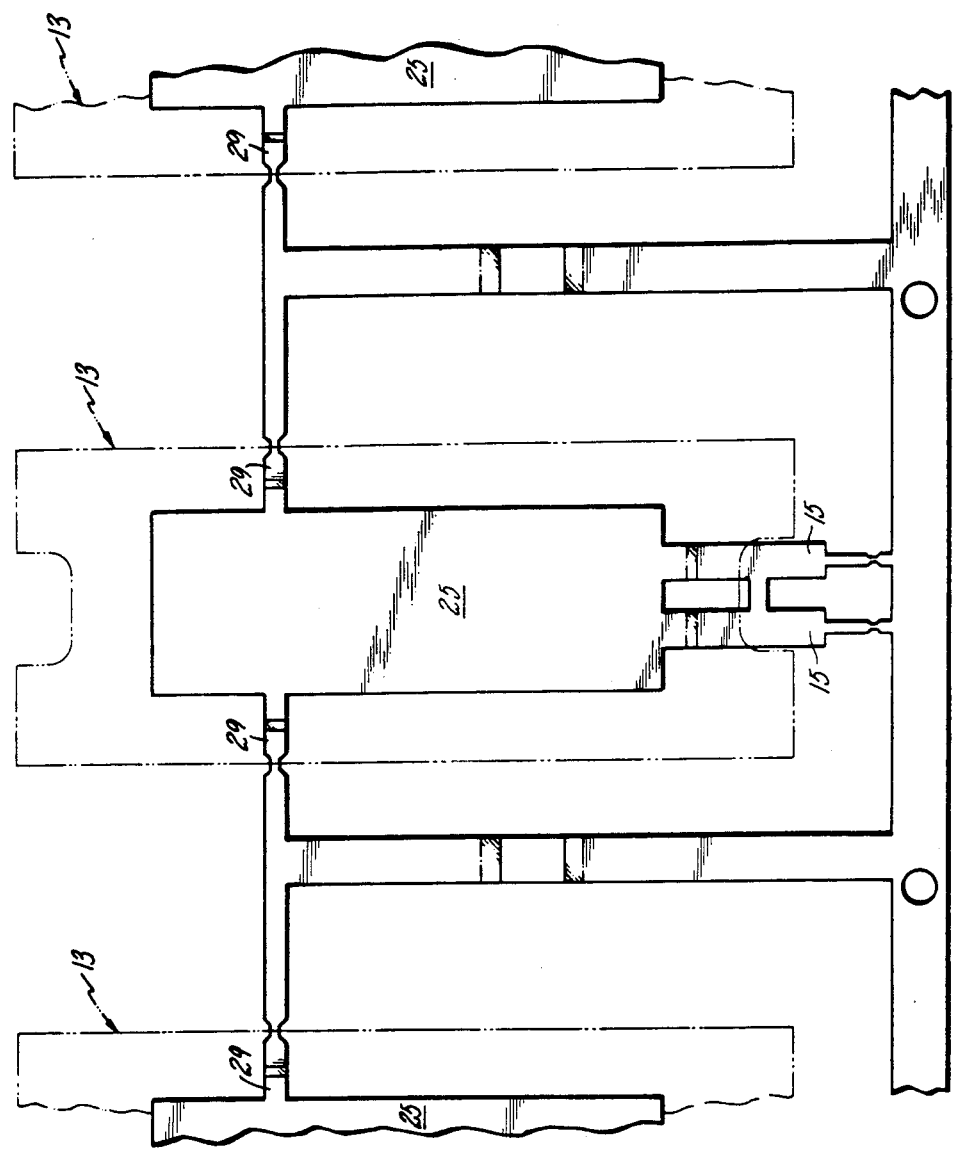
FIG. 2A shows a detail of the anode leadframe material at an early stage of processing the battery with the phantom outline of a complete battery superimposed thereover.
Figure 2B:
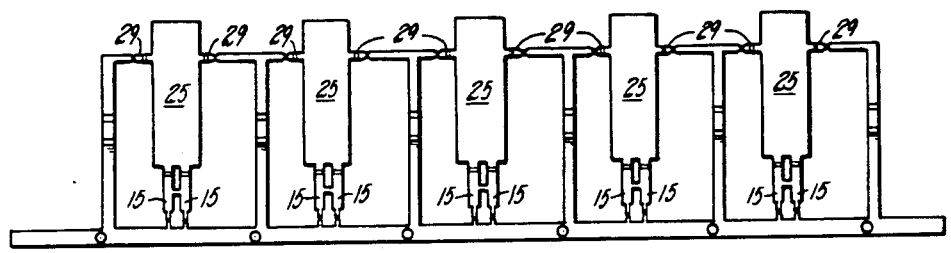
FIG. 2B shows multiple units of such anode leadframe material at the same early stage of processing the battery as shown in FIG. 2A.

By way of greater detail, the anode plate 25, for example, is formed (as by punching, for example) from conventional leadframe material, which is preferable, for example, ten mils thick, together with contact leads 15 and 16. This is shown in detail in FIG. 2B, which disclosed a five unit strip of punchedout leadframe material which can be used to create five anode plates 25. Ten mils is equivalent to 1/100 of an inch.

The anode plate 25 is further provided with a suitable lithium anode material 42, for example, as indicated in FIG. 1E. This may involve electro-plate deposit of the lithium material, for example, to a thickness of approximately five mils on the anode plate 25. In lieu of electro-plating, a lithium foil, for example placed in physical contact with the anode plate 25 may be substituted.

The inner central material 44, for example, includes an electrolyte-saturated separator material, such as woven glass wool or cloth. This inner central material 44 is, for example, ten mils thick. This material 44 holds a selected electrolyte in place by means of surface tension forces, for example.

Figure 4A:
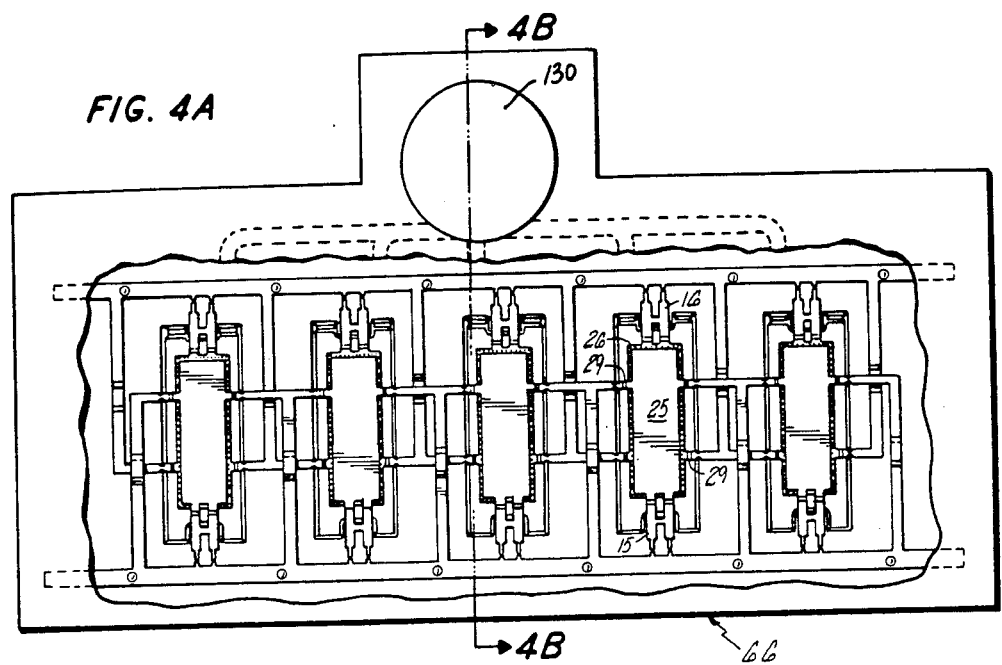
FIG. 4A illustrates in plain view partially broken away, a transfer mold which can be used in making batteries according to the invention presented herein.
Figure 4B:
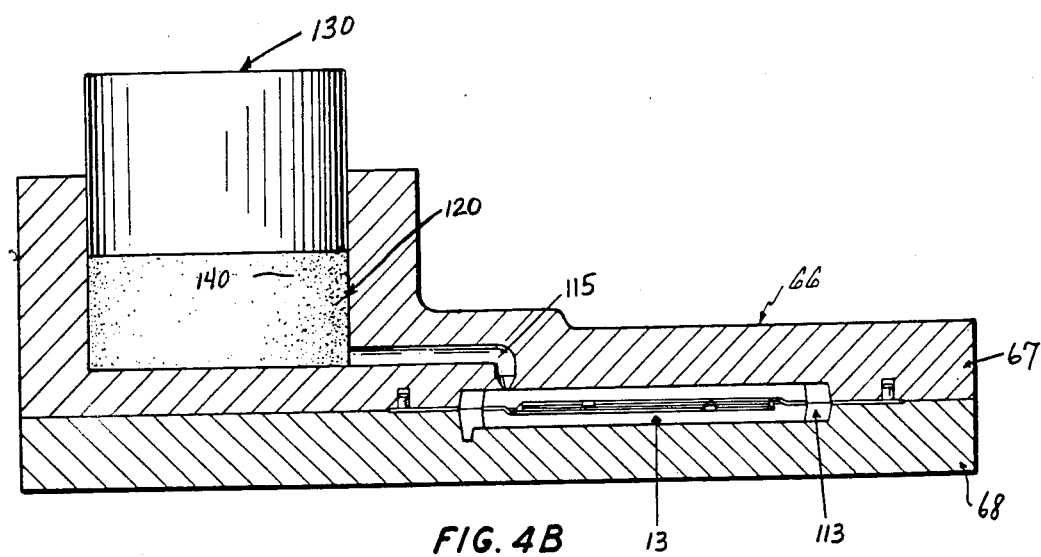
FIG. 4B is a cross-sectioned view taken along lines 4B—4B of FIG. 4A.

The electrolyte material selected and the structure of the battery itself, as shown, establishes a high level of internal resistivity for the battery. This limits the amount of electric current which will be discharged when the lead 15 and 16, are temporarily shorted together by the electrically conducting mold 66, shown in FIG. 4, during manufcture. Mold 66, for example, includes upper and lower mold parts, respectively 67 and 68, which cooperatively define recesses 113 in the form of batteries 13 to be formed therein. Mold 66 additionally defines, in either or both of parts 67 and 68, channels 115 leading to said respective recesses 113 in the form of batteries 13 to be formed therein. Mold 66 additionally defines, in either or both of parts 67 and 68, channels 115 leading to said respective recesses 113 from a central aperture 120 extending substantially through upper part 67 for receiving and transporting mold material to be used in forming batteries 13. Central aperture 120 is for example cylindrical, and receives cooperatively a piston 130 which can be mechanically driven after insertion of a pellet 140 of said mold material sufficient in volume to fill each of said recesses 113 with mold material as well as channels 115 and a portion of aperture 120 through which it is driven.

The pellet 140 is generally pre-heated prior to transfer molding. The mold 66 is typically metallic and electrically conductive. Accordingly, after the components of batteries 13 are assembled with their respective leadframes including anode and cathode plates, 25 and 26, for a predetermined number of batteries, and including the material 44 and 45, whether stuck together with material 39 for ease of assembly or not, and the assembly is placed between mold parts 67 and 68 for transfer molding, leads 15 and 16 of the respective batteries are effectively shorted together, drawing current from the battery during manufacture, while in mold 66. The high internal resistance of the battery 13 prevents depletion and destruction of the battery 13 during the term of processing.

Figure 3B:
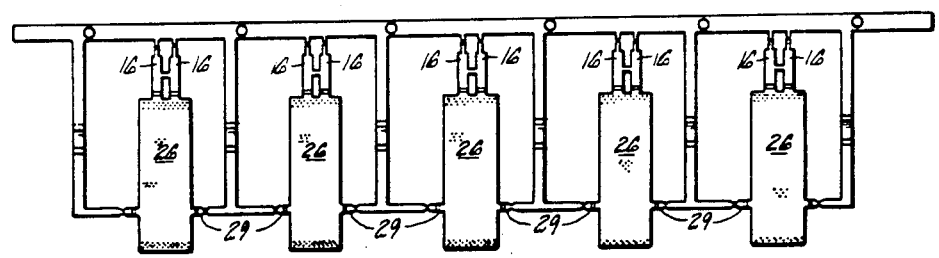
FIGS. 3A and 3B respectfully show similar views as shown in FIGS. 2A and 2B respectively illustrating the cathode plates, the detail view thereof emphasizing the holes in the cathode plate as well as showing the phantom outline of a complete battery superimposed thereover.

The cathode plate 26 is preferably made from formed nickel plated alloy such as Alloy "42" leadframe material which is about ten mils thick. A five unit strip of such material, cut to establish five cathode plates 26 is shown in FIG. 3B.

Figure 3A:
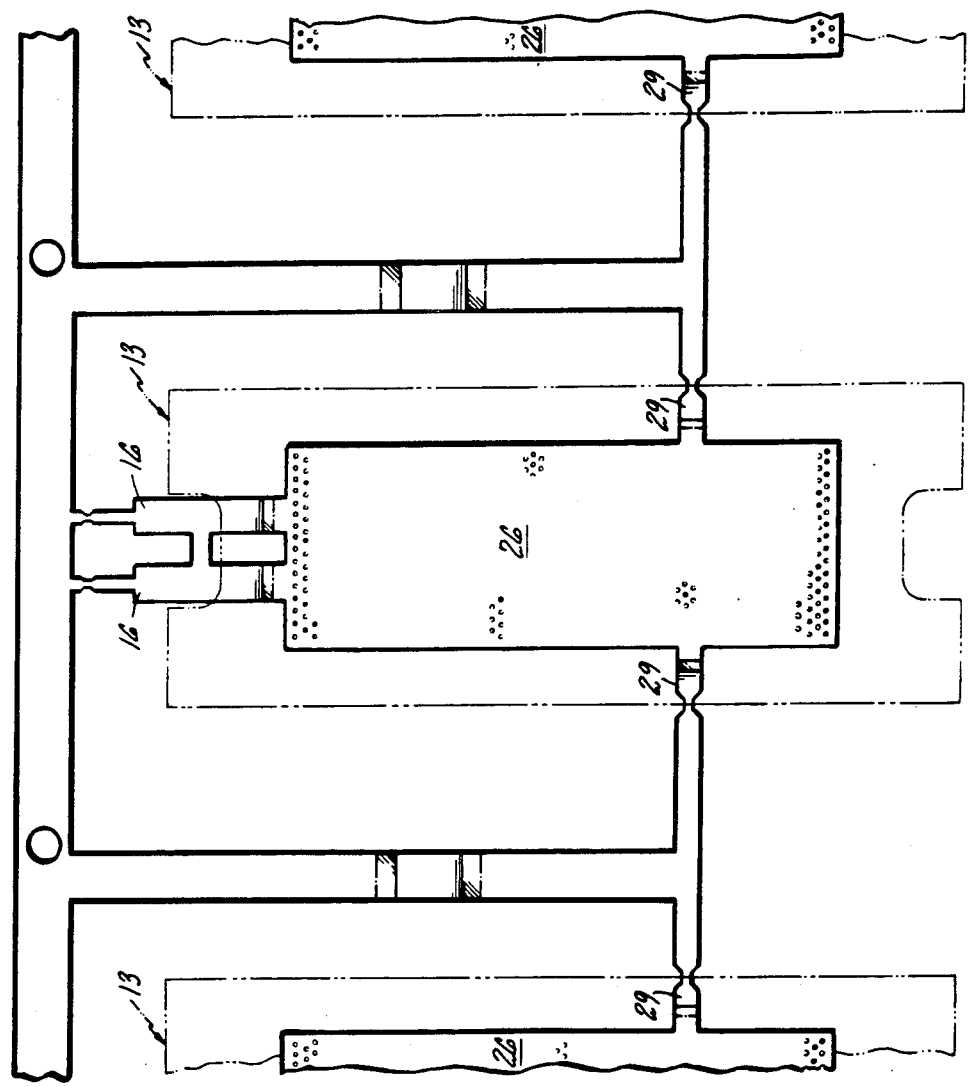

The plate 26 is perforated, as discussed above, with for example ten-mil diameter holes on 20 mil-centerlines comprising a hexagonal pattern. This is graphically illustrated in FIG. 3A, which includes fragments of leadframe material subsequently removed during "trim and form" operation.

In between the central material 44 and the cathode plate 26, a suitable intermediate substance 45 such as, for example, copper oxy-phosphate cathode material is introduced in pressed form to a thickness of about five mils. It is pressed against the cathode plate 26 in order to hold it into place. Saft America, Inc. of Cockeysville, Md., is one company which makes the copper oxy-phosphate cathode material.

This battery 13 can be constructed by various fabrication techniques. A preferred way to carry out this invention and to produce the battery discussed above is to load the cathode leadframe 26 which cathode material 45 pre-pressed on the leadframe into the base of a suitably formed metal frame which in turn is loaded into an electrically conductive mode (not shown) which is mounted in a press made by Kras Corporation for example. Such molds typically include mold pieces which are metallic and cause the battery leads and plates to short out when the mold pieces are pressed into closed position to mold the part. Such molding can be performed by transfer molding or injection molding and other similar molding processes.

An electrolyte-retaining central material 44 is then loaded onto each cathode plate 26 of the cathode leadframe 26'.

Thereafter, a suitable battery electrolyte material or liquid is dispensed into central material 44. One example of such a material is a one percent (1%) solution of lithium chloride in water or other liquid. The current drawn by a high resistance arrangement of this version of the invention could be on the order of one (1) microampere.

Next, the anode leadframe 25 with pre-attached anode material 42 including many individual anode plates 25 is loaded over the electrolyte-retaining material 44.

Light pressure may be applied to the assembly including the anode and cathode plates 25 and 26 and central material 44. A sealant material 39 can be dispensed onto the end portions of the assembly. This sealant material 39 effectively holds the entire assembly including anode and cathode plates 25 and 26, and central material 44, if needed, together to facilitate handling during manufacture.

Once applied, the sealant 39 is permitted to cure.

Next, a suitable molding compound is introduced into the mold by well known transfer mold techniques, or by injection molding techniques.

According to the transfer mold techniques, two parallel upper and lower mold pieces 67 and 68, as discussed above, are brought together in a press machine (not shown) holding the mold 66. The mold 66 defines one or more cavities or recesses 113 each individually defining the final package products. Each such cavity 113 is reachable through a network of ducts or channels 115 from a central cavity or aperture 120 holding an amount of pellet of plastic material, such as Morton 450-2 for example, a substance produced by Morton Thiokol, Inc. The plastic material is typically preheated and is driven through the network of ducts 115 into each of the cavities 113 defining the final package product. Each of the cavities is vented, and the air or gas within the cavities 113 is displaced by the transferred plastic.

After assembly of the leadframes, including anode and cathode plates 25 and 26, anode and cathode materials 42 and 45, and the central material 44 therebetween, the upper and lower portions, 67 and 68, of mold 66 which are metallic, come together and touch both anode and cathode sides of each battery, effectively shorting out the battery and thus shortening the lifetime of the battery.

However, because of the high internal resistance of the battery, the amount of current drawn during the relatively short period of molding is not so long as to render the battery unmerchantable and ineffective. As already indicated, the current to be drawn in a battery according to one version of the invention is on the order of one (1) microampere.

After molding is completed, the battery is trimmed and formed by conventional semiconductor packaging methods, and then finally tested.

A battery so constructed can be employed effectively in conjunction with a semiconductor memory device, as for example the Mostek 48Z08 Zeropower (R) chip by riding "piggy-back" as it were on the memory chip's dual in-line package.

The above description is likely to lead others skilled in the art to conceive of further embodiments of the invention. Accordingly, attention is directed to the claims which follow, as these alone authoritatively specify and define the bounds of the invention. For example, one could construct a mold that does not short out the battery during manufacture, by providing a mold that insulates the leads of the battery. This means the battery would not have to have high internal resistance, and a high concentrate electrolyte would be used.

I claim:

1. A method for producing a plurality of battery packages comprising the steps of:
   forming an array comprising a plurality of attached planar anode plates; and
   forming an array comprising a plurality of attached planar cathode plates;
   forming an assembly which comprises disposing said arrays over one another such that said anodes and cathodes are in a spaced, coinciding, parallel relationship; and
   forming an electrolyte between said anode and cathode plates;
   arranging said assembly within a recess formed between upper and lower mold elements of a transfer mold, said recess defining a plurality of battery package condigurations corresponding to each of said coinciding anodes and cathodes; and
   injecting a plastic molding compound into said recess through a distribution aperture communicating with said recess; and
   separating said upper and lower mold elements; and removing the formed battery packages from said recess.

2. The method according to claim 1 wherein said steps of forming said assembly and arranging said assembly within said recess comprises the steps of first arranging said cathode array into said lower mold element, applying said electrolyte to said cathode array, placing said anode array over said electrolyte, and positioning said upper mold element over said lower mold element, thus forming said recess between said mold elements with said assembly arranged therein.

3. The method according to claim 2 wherein said step of applying said electrolyte onto said cathode array so as to be positioned between said anode and cathode plates comprises the step of arranging an electrolyte retaining central material onto said cathode array, and thereafter dispensing into said electrolyte retaining central material an electrolyte materal.

4. The method according to claim 3 wherein said electrolyte retaining central material is a woven glass wool.

5. The method according to claim 1 further comprising the step of inserting an intermediate material between said electrolyte and said cathode array.

6. The method according to claim 5 wherein said intermediate material is a copper oxy-phosphate pressed against said cathode plates.

7. The method according to claim 1 comprising the further step of applying light pressure to said assembly within said recess.

8. The method according to claim 1 comprising the further step of dispensing a sealant material onto end portions of said assembly prior to injecting said plastic molding compound into said recess.

9. The method according to claim 1 comprising the further step of forming perforations in said cathode plates, said perforations being approximately 10 mils in diameter and spaced on 20 mil centers.

10. The method according to claim 1 comprising the further step of forming said anode and cathode plates by punching said plates from leadframe material.

11. The method according to claim 1 wherein said molding compound is preheated prior to injecting said molding compound into said recess.

12. The method of claim 1 wherein said mold elements are electrically conductive.

13. The method of claim 12 wherein a portion of said anode plates and cathode plates comprise battery leads, and the portion of said upper and lower mold elements corresponding to said battery leads is electrically insulating.

* * * * *